United States Patent [19]

Bodine et al.

[11] 3,719,272

[45] March 6, 1973

[54] INTERLOCKING CASE FOR ELECTRONIC COMPONENTS

[75] Inventors: Norman R. Bodine, Oshkosh; David C. Noetzelmann, Sr., Minatare, both of Nebr.

[73] Assignee: Midwec Corporation, Oshkosh, Nebr.

[22] Filed: Nov. 3, 1971

[21] Appl. No.: 195,194

[52] U.S. Cl. ................206/65 F, 220/4 D, 220/23.2, 220/23.83, 220/40

[51] Int. Cl. ............................B65d 7/00, B65d 71/00

[58] Field of Search....206/42, 46 ED, 65 F; 220/4 B, 220/4 C, 4 D, 3.94, 8, 23.2, 23.4, 23.6, 23.8, 23.83, 23.86, 40 R

[56] References Cited

UNITED STATES PATENTS

| | | | |
|---|---|---|---|
| 2,670,870 | 3/1954 | Fleischer | 220/3.94 |
| 1,216,031 | 2/1917 | Wilcox | 220/8 UX |
| 3,369,691 | 2/1968 | Wei | 220/4 D |
| 2,678,861 | 5/1954 | Funk | 220/4 D X |
| 3,273,739 | 9/1966 | Wei | 220/4 D |
| 3,552,548 | 1/1971 | Wallestad | 206/65 F X |
| 2,472,620 | 6/1949 | Rhodes et al. | 220/4 C |
| 2,577,120 | 12/1951 | Franz | 220/23.2 |

*Primary Examiner*—Joseph R. Leclair
*Assistant Examiner*—Steven E. Lipman
*Attorney*—Bertha L. MacGregor

[57] ABSTRACT

An interlocking case for electronic components which comprises an inverted cup shaped member having a plurality of circumferentially spaced apart tabs projecting radially from its top, and an open top cup shaped member having a plurality of circumferentially spaced tabs projecting inwardly from its side wall below the bottom of said member, the inverted cup shaped member being seated in said open top member. Said members have registering openings in their side walls for passage of wiring from the inverted cup shaped member, and means on their proximate side wall surfaces which prevent rotation of the two case members relatively to each other. The tabs on the top of one case engage the tabs on the bottom of another case for stacking a plurality of cases.

8 Claims, 6 Drawing Figures

PATENTED MAR 6 1973

3,719,272

INVENTORS.
NORMAN R. BODINE
DAVID C. NOETZELMANN, SR.
BY
Bertha L. MacGregor
ATTORNEY

INTERLOCKING CASE FOR ELECTRONIC COMPONENTS

This invention relates to an interlocking case for electronic components comprising two members which cooperate to form an encasing container that completely encloses the electronic components and encapsulant therefor. A plurality of the said cases may be assembled into an interlocked unit by means of mating tabs or lugs on the top of one case and the bottom of another case. The electronic components which may be encased in the cases of our invention include load coils, capacitors, combinations of capacitors and resistors or combinations of coils and resistors, etc.

The main object of the invention is to provide an interlocking case for electronic components consisting of two members assembled into contact with each other to form a closed container which protects the contents.

Another object is to produce an interlocking case for electronic components consisting of two cup shaped members one of which fits snugly into the other and bonded together by their frictional engagement and by the encapsulant in which the electronic components are embedded in one of the two members.

Another object of the invention is to produce a two-part case of the character described which provides a complete enclosure and container for electronic components by means of which the filling of the container and assembly of its parts into the finished device may be performed in one operation. For this purpose, the upper or top cup member of the case is inverted, the electronic components are placed in the inverted top member, with their wiring passed through a hole in the said top member, the encapsulant is poured into the said member to cover the components and completely fill the cup, the lower or bottom cup member is inverted and dropped over the filled top member while the encapsulant is still tacky, and then the whole assembly is inverted. The completion of this operation returns the bottom cup shaped member to its normal lower position in the assembly, with the outer surface of the annular side wall of the top cup member contacting the inner surface of the side wall of the bottom member in frictional engagement, and the encapsulant bonding the top and bottom members together without the aid of a threaded engagement between the two parts.

Another object of the invention is to provide a hole or holes in the side of the top cup member cooperating with a slot or slots in the side of the bottom cup member when assembled to accommodate the lead wires passing from the components to externally of the case. The absence of any threads for engagement of the two parts of a case with each other and the assembly of the parts by movement thereof toward each other in axial direction only facilitates the use of the herein shown cooperating hole and slot arrangement.

Another object is to provide interlocking mating lugs on the circumferential outer surface of the top of one case and on the circumferential inner surface of the bottom of another case for assembling two or more cases into a stacked arrangement forming an interlocked unit of any desired number of individual cases.

Figure 1:
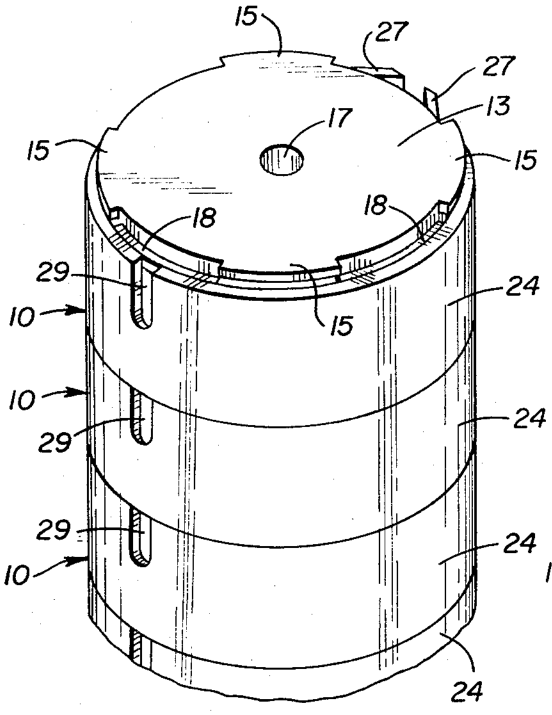
FIG. 1 is a perspective view of a plurality of interlocking cases embodying our invention in assembled stacked arrangement forming a unit.

In the embodiment of the invention shown in the drawings, an assembled stack (FIGS. 1 and 3) comprises a plurality of individual interlocking cases 10. Each case 10 consists of an upper inner cup shaped member 11 and a lower outer cup shaped member 12.

Figure 2:
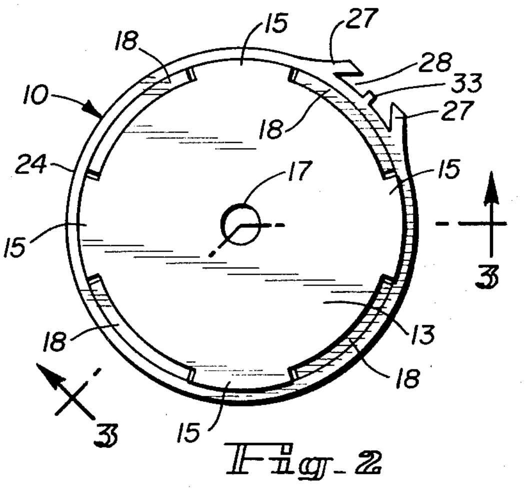
FIG. 2 is a top view of the assembly shown in FIG. 1.
Figure 4:
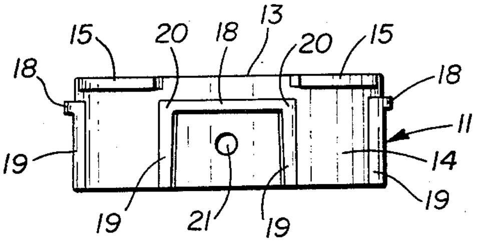
FIG. 4 is an elevational side view of the upper or top member of an interlocking case embodying our invention.

The top cup shaped member 11 has a flat top 13, depending annular side wall 14, four tabs or lugs 15 which extend radially outwardly from the top 13 beyond the circumferential outer surface of the side wall 14, and a centrally located vertical sleeve 16 depending from the top 13 and defining a bore 17. The annular side wall 14 has four groups of ribs, one horizontal rib 18 and two vertical ribs 19, located on said side wall 14 in the areas between the tabs 15, joined together as indicated at 20 in FIG. 4. The horizontal ribs 18 thus project radially beyond the circumferential edge of the top 13, in a plane below the plane of the tabs 15, the outer edges of tabs 15 and ribs 18 coinciding in one circumferential line as shown in FIG. 2. A hole 21 is located in the side wall 14 between the vertical ribs 19 of one group of ribs 18, 19.

Figure 3:
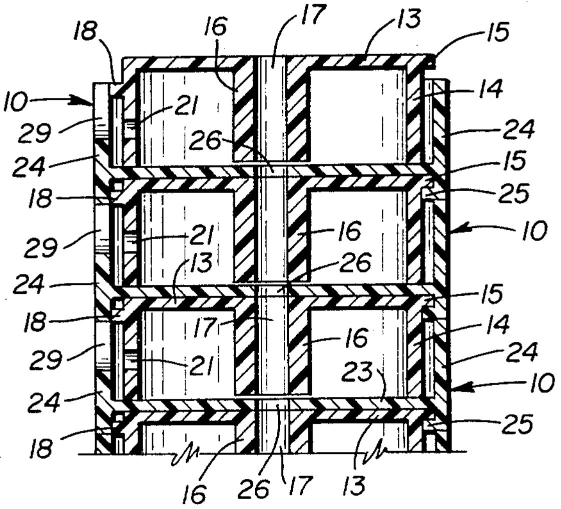
FIG. 3 is a vertical sectional view in the planes of the lines 3—3 of FIG. 2.
Figure 5:
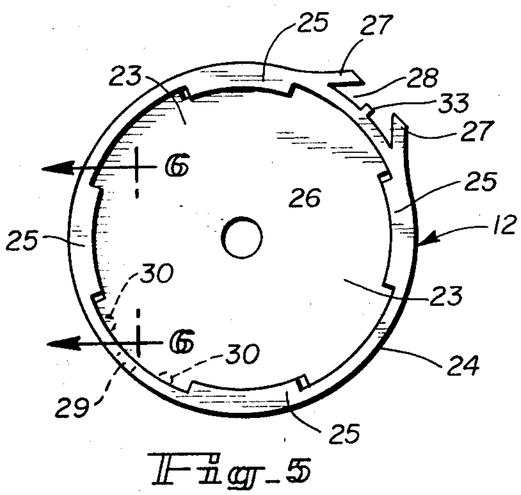
FIG. 5 is a bottom view of the lower or bottom member of one of the interlocking cases.

The bottom cup shaped member 12 is sized to receive the upper member 11, and comprises a flat bottom 23, upwardly extending annular side wall 24, four tabs or lugs 25 extending inwardly in radial directions from the annular side wall 24, below the bottom 23, and a centrally located opening 26. A pair of converging extensions 27 on the annular wall 24 form a vertical groove 28 between them, providing means for fastening the assembled case 10 or a stack of cases to a support (not shown). The side wall 24 has a slot 29 extending downwardly from the upper edge of the wall, open at its upper end as shown in FIGS. 1 and 3. On the inner surface of the annular wall 24, opposite the extensions 27, and on opposite sides of the slot 29, are vertical ribs 30, as shown in FIG. 5, for a purpose to be described.

Figure 6:
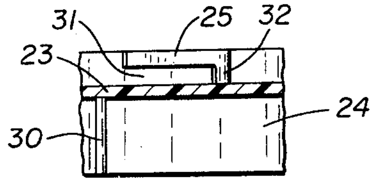
FIG. 6 is a vertical sectional view in the plane of the line 6—6 of FIG. 5.

The tabs 25 of the bottom member 12 extend inwardly from the annular side wall 24 in a plane below the bottom 23, forming a space 31 between the tabs 25 and said bottom 23. This space 31 is open at one end and closed by the obstruction 32 at the other end, as shown in FIG. 6.

To assemble the two part case into a closed container, the top cup shaped member 11 is inverted, the electronic components are placed in the said member, with their wiring (not shown) passed outwardly through the hole 21, and the encapsulant is poured over the components to fill the cup 11. Then the bottom member 12 is inverted and dropped over the filled top member 11, with the slot 29 registering with the hole 21 in position to receive the component wiring to extend outwardly through the slot. In this position, the bottom 23 contacts the edge of the annular wall 14 and the encapsulant in the case member 11. In this step of the assembling of the parts, the encapsulant is still tacky and thus bonds the upper case member 11 and lower case member 12 together. Finally the cooperating assembled parts 11 and 12 are inverted to return the top 11 to its upper position in the assembly.

Any number of the cases 10 may be stacked and connected into a unitary structure as shown in FIGS. 1 and 3 by slipping the tabs 25 at the bottom of one case into the spaces between the tabs 15 at the top of another case 10 just above the horizontal ribs 18, and then rotating one of the cases 10 relatively to the other to move the tabs 15 into the space 31 between the tabs 25 and bottom 23 of the lower member of a case until the side edges of the tabs 15 bear against the obstruction 32 at one end of the space 31.

The sleeve 16, bore 17 and hole 26 serve for use in mounting an individual case on any desired support (not shown). A rib 33 of any desired form may be provided on the annular side wall 24 of the bottom member 12 in the groove 28 between the convergent extensions 27, for engagement by the head of a bolt (not shown) to prevent rotation of the bolt which may be inserted in the groove 28 for mounting the device on a support.

The horizontal ribs 18 on the outer surface of the annular wall 14 serve to define the area in which the tabs 25 of the lower member of a case 10 may contact the upper member of a case 10 before relative rotation of the cases to produce engagement of mating tabs for stacking purposes. Also, the ribs 18, 19 facilitate removal of the cup shaped member 11 from the molds employed in making said members. The ribs 30 on opposite sides of the slot 29, on the inner surface of the annular wall 24 of the bottom member 12, fit between the vertical ribs 19 adjacent the hole 21 of the upper cup and thus serve to index the registering of the slot 29 and hole 21 and to prevent relative rotation of the two case members.

Augmenting the bonding effect of the encapsulant between the case members 11 and 12, adhesive may be applied to the outer surface of the annular wall 14 of the upper cup member and to the inner surface of the annular wall 24 of the lower cup member as well as on the proximate edges, to provide a firmly bonded container for electronic components.

We claim:

1. An interlocking case for electronic components comprising a. an inverted cup shaped member having a top, a depending annular side wall, and a plurality of circumferentially spaced apart tabs projecting radially outwardly from the top, b. an open top cup shaped member having a bottom, an annular side wall extending above and below the bottom, and a plurality of circumferentially spaced apart tabs projecting inwardly from the annular side wall below the bottom, the inverted cup shaped member being seated in said open top cup shaped member, c. registering openings in the annular side walls of said members for passage of wiring from the inverted cup shaped member, and d. means on the proximate side wall surfaces of the said members preventing rotation of said members relatively to each other.

2. The interlocking case defined by claim 1, in which the inverted cup shaped member is provided with a plurality of horizontally disposed ribs on its annular side wall, located in a plane below the top intermediate radially projecting tabs for defining the area in which the inwardly projecting tabs of another case may contact the said inverted cup shaped member for limited rotation and engagement of the outwardly projecting tabs of said inverted cup shaped member when a plurality of cases are stacked for interlocking into a unit.

3. The interlocking case defined by claim 1, in which the circumferentially spaced apart and inwardly projecting tabs on the open top cup shaped member are each spaced from the bottom by a space open at one end and closed at the opposite end for reception of the outwardly projecting tabs on the top of the inverted cup shaped member of another case when a plurality of cases are stacked for interlocking into a unit.

4. The interlocking case defined by claim 1, which includes a pair of convergent extensions on the side wall of the open top cup shaped member, said extensions forming a groove between them for receiving the slotted head of a bolt, and means on said side wall in the groove for engaging the head of a bolt for preventing rotation of the bolt in the groove.

5. The interlocking case defined by claim 1, in which the means on the proximate side wall surfaces of the said cup shaped members for preventing rotation comprise a plurality of vertical ribs on the side wall of each of said members for contacting the side wall of the other.

6. The interlocking case defined by claim 1, in which the registering openings in the annular side walls of said cup shaped members are a hole in the inverted cup shaped member and a slot in the other cup shaped member, said slot being closed at one end and open at the other end for placement of the slotted cup shaped member over the other when wiring has been passed outwardly through the hole in the inverted cup shaped member.

7. The interlocking case defined by claim 1, which includes a plurality of groups of horizontal and vertical ribs on the annular side wall of the inverted cup shaped member, located in the areas intermediate the radially projecting tabs of said member, below the horizontal plane of said tabs, and a plurality of vertical ribs on the inner surface of the side wall of said open top cup shaped member.

8. The interlocking case defined by claim 7, in which the registering openings in the side walls of said cup shaped members are a hole in the inverted cup shaped member and a slot in the open top cup shaped member, and the vertical ribs of a group of ribs on the inverted cup shaped member are located adjacent opposite sides of said hole in the inverted cup shaped member, and the slot in the open top cup shaped member is located between a pair of ribs on said member which engage the ribs on the other member and prevent relative rotation of said members.

* * * * *